Feb. 9, 1960      F. V. ATKESON      2,924,695

ELECTRIC FURNACE CONTROL METHOD

Original Filed Jan. 12, 1953      4 Sheets-Sheet 1

INVENTOR.
FLORIAN V. ATKESON
BY
Oscar L. Spencer
ATTORNEY

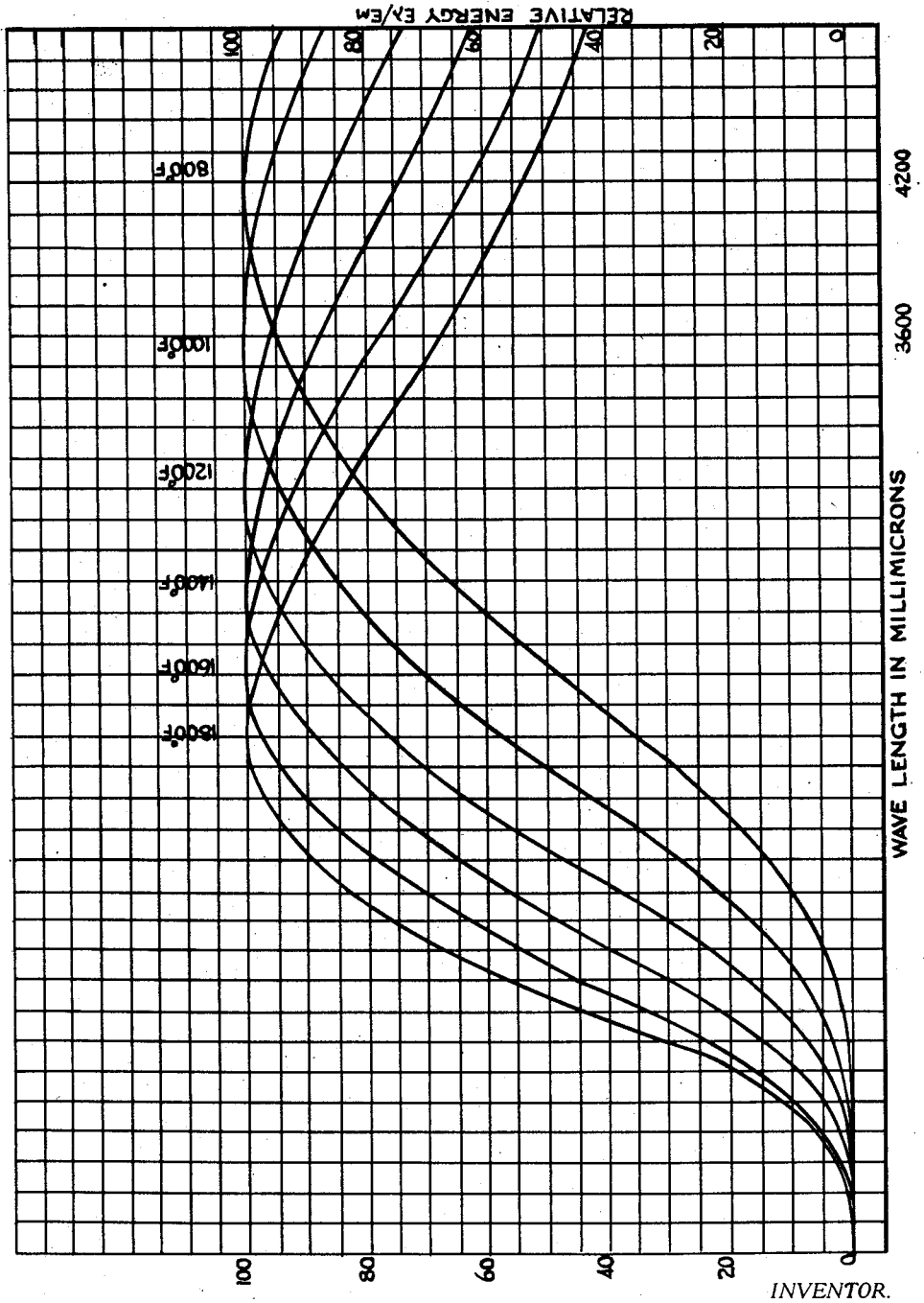

Feb. 9, 1960    F. V. ATKESON    2,924,695
ELECTRIC FURNACE CONTROL METHOD
Original Filed Jan. 12, 1953    4 Sheets-Sheet 3

INVENTOR.
FLORIAN V. ATKESON
BY
Oscar L. Spencer
ATTORNEY

Feb. 9, 1960   F. V. ATKESON   2,924,695
ELECTRIC FURNACE CONTROL METHOD
Original Filed Jan. 12, 1953

INVENTOR.
FLORIAN V. ATKESON
BY
Oscar L. Spencer
ATTORNEY

United States Patent Office 2,924,695
Patented Feb. 9, 1960

2,924,695

ELECTRIC FURNACE CONTROL METHOD

Florian V. Atkeson, Springdale, Pa., assignor to Pittsburgh Plate Glass Company, a corporation of Pennsylvania Continuation of application Serial No. 330,833, January 12, 1953. This application January 9, 1956, Serial No. 557,954

2 Claims. (Cl. 219—34)

The present invention relates to a method of heating glass uniformly wherein optimum use is made of the energy applied to glass for heating purposes.

As a result of a series of studies of the transmission and absorption of heat energy by glass, it has been determined that glass has a transmission characteristic that varies with the wavelength of radiant energy impinging on the surface of the glass. It has been observed that radiant energy longer than a certain wavelength characteristic of each glass composition is readily absorbed by the glass, whereas for wavelengths shorter than the characteristic wavelength, the glass transmits a large proportion of the incident radiant energy thereby causing the waste of a large percentage of the radiant energy that could be useful for heating purposes.

While it would seem to be logical for glass to be heated more rapidly at higher furnace temperatures than at lower temperatures, strangely enough, it has been discovered that for each glass composition and thickness there is an optimum radiant level which is not necessarily associated with the highest possible temperature to which the glass can be subjected at which the maximum heating of a volume of glass occurs.

Accordingly, it is an object of the present invention to provide a system of determining the most efficient method of heating glass wherein a minimum of energy is expended to obtain the maximum possible amount of heating of the entire volume of glass.

Another object is to provide a practical device for heating glass utilizing the system hereinafter disclosed.

These and other objects of the present invention will become apparent upon a closer study of the accompanying disclosure taken in conjunction with the attached drawing. It is to be understood, however, that the embodiment disclosed in the present application is for purposes of illustration only and does not necessarily define the limits of the present invention, reference to the latter being had by reading the accompanying claims.

In the drawing:

Figure 1 represents a typical curve showing percentage transmission of radiant energy through a typical glass composition at different wavelengths of radiant energy;

Figure 2 represents a series of radiant energy distribution curves showing the relative amounts of energy distributed at various wavelengths, where the maximum energy distributed at any temperature in a wave band of width $d\lambda$ is represented by 100 and shows the relative energy distribution of radiant energy for various wave bands of width $d\lambda$ at different wavelengths in the infrared region of the spectrum for bodies emanating radiation at various temperatures from 800 to 1800° F.;

Figure 1:
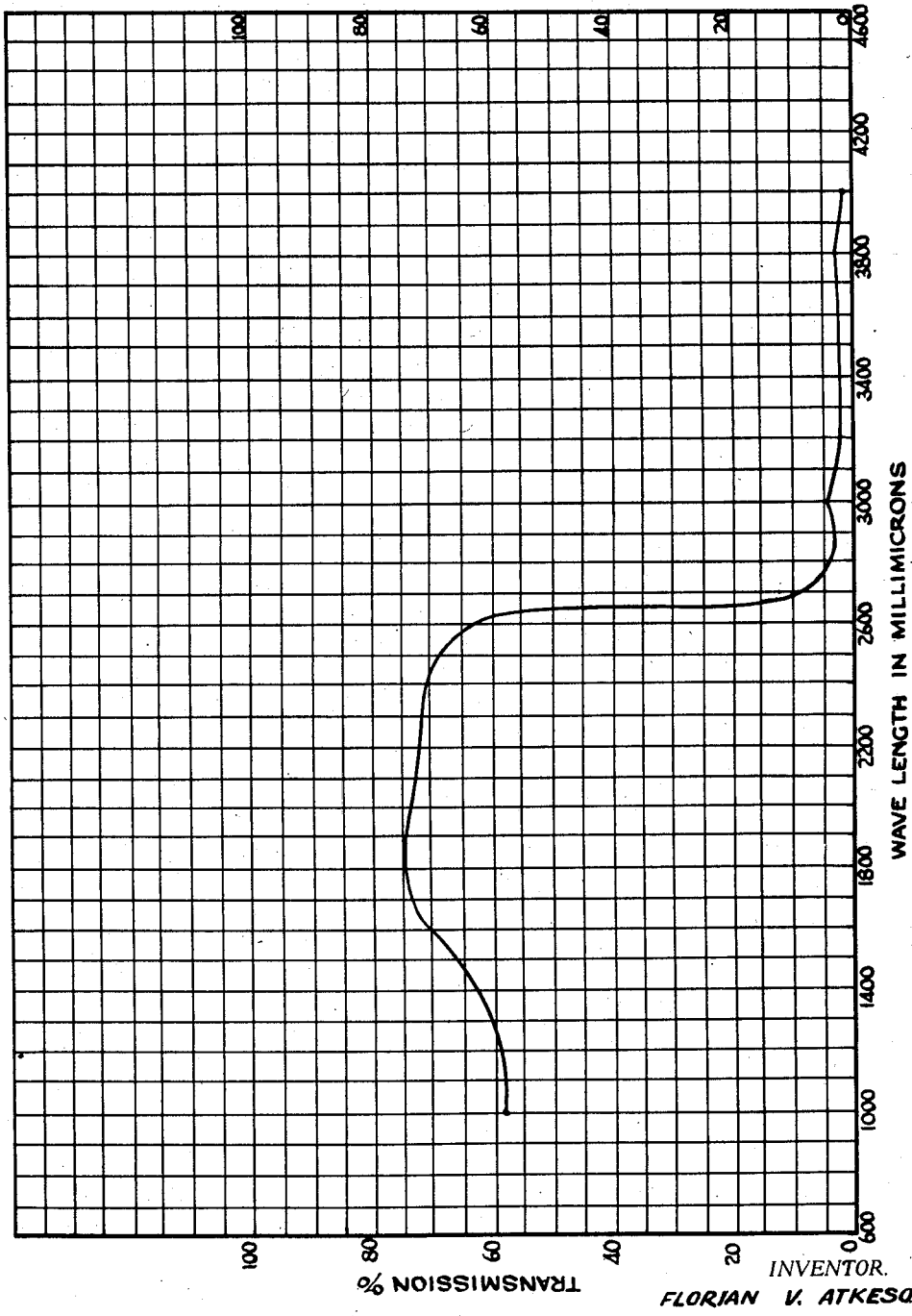

It is a well known phenomenon that more efficient heating is obtained by exposing a body to radiant energy when the percentage of energy transmitted through the body is small, thereby resulting in a large percentage of incident energy being absorbed to heat the body. Studies undertaken with a soda-lime-silica glass approximately comprising:

| | Parts by weight |
|---|---|
| $SiO_2$ | 71.50 |
| $Na_2O$ | 13.50 |
| CaO | 12.00 |
| MgO | 2.50 |
| $Fe_2O_3$ | 0.10 | have determined that this glass composition transmits over 60% of radiant energy having wavelengths less than approximately 2600 millimicrons, whereas at longer wavelengths the transmission percent drops very rapidly to a figure below 5%. (See Fig. 1.) Therefore, the glass under study absorbs over 95% of impinging radiant energy of wavelengths in excess of 2600 millimicrons. Radiant energy in this latter wavelength range is over 95% effective in heating the glass, whereas energy transmitted in wavelengths shorter than 2600 millimicrons for the glass composition studied is, for the most part, transmitted rather than absorbed by the glass. Therefore, energy of wavelengths shorter than 2600 millimicrons is relatively inefficient in heating the glass.

As seen in the curves shown on Figure 2 wherein the energy distributions at various temperatures are disclosed, it is noted that the maximum energy radiated from a body at 800° F. is at a wavelength slightly below 4200 millimicrons, at 1000° F. the maximum energy is radiated at approximately 3600 millimicrons and at 1200° F. the maximum energy is about 3150 millimicrons, etc. The total energy radiated at the various temperatures relative to the maxima is measured by the total area under the curve represented by each temperature. Thus at 800° F., a relatively large proportion of the energy radiated to the glass at this temperature is in the region of maximum absorption by the glass, and hence only a small porportion of this energy is of a wavelength shorter than 2600 millimicrons, which wavelength energizes inefficiently heat the glass. While a greater total of heat energy is radiated to the glass at 1000° F., a greater proportion of this additional heat is wasted since the inefficiency increases with an increase in temperature.

Thus, it is important in the heating of glass to control the temperature of the walls of a furnace surrounding the glass so that the temperature is at the optimum level of absorption of radiant energy of the glass to heat the glass uniformly throughout its depth rather than overheat its surface and have the radiant energy transmitted through the volume of the glass without heating.

While it is recognized that the heating curves disclose that considerable energy is transmitted at both lesser and greater wavelengths than the maxima shown in the various distribution curves, it has been demonstrated that where the peak radiation temperatures can be kept in the absorption spectra of the glass, a more efficient heating effect is obtained. Conversely, where higher radiant levels are utilized and the peak temperatures are shifted into the region where a higher percentage of transmission takes place, less efficient heating occurs with the result that the glass is overheated in the region of the surface at the expense of heating through its entire depth, while at the same time the higher radiant level consumes additional power.

The optimum degree of absorption desired for the glass depends upon the thickness of glass sheets to be heated as well as the particular composition of the glass. It is a combination of transmission and absorption that determines the uniformity of glass heating throughout the entire volume of the glass. If the glass absorbs too high a percentage of incident radiant energy, the surfaces are liable to be overheated rapidly at the expense of heating the interior. This results in a temperature gradient through the thickness greater at the surfaces than at the interior. Too much transmission also results in an unacceptable temperature gradient that is slowly minimized by the relatively inefficient conduction through the glass. Only at the proper absorption level of the glass heated are these gradients minimized and the maximum heating efficiency obtained throughout the entire volume of the glass.

Figure 4:
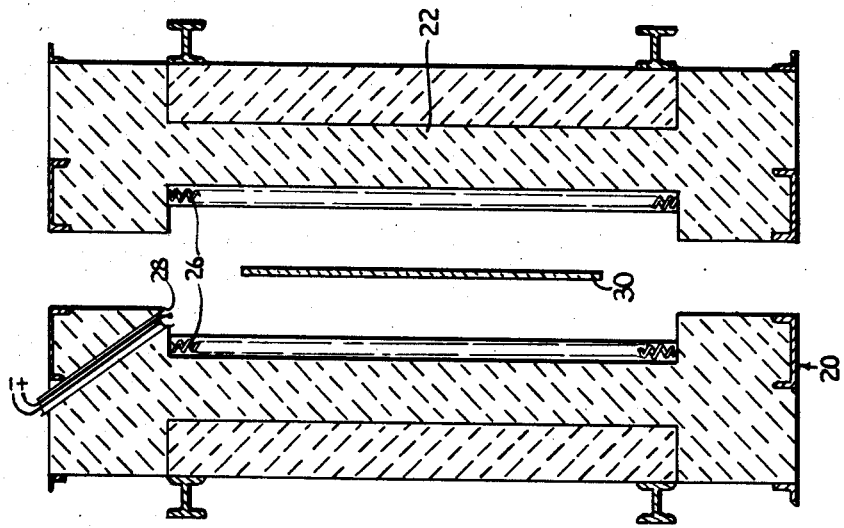
Figure 4 is a cross-sectional view taken at right angles to the view shown in Figure 3 along the lines 4—4.
Figure 3:
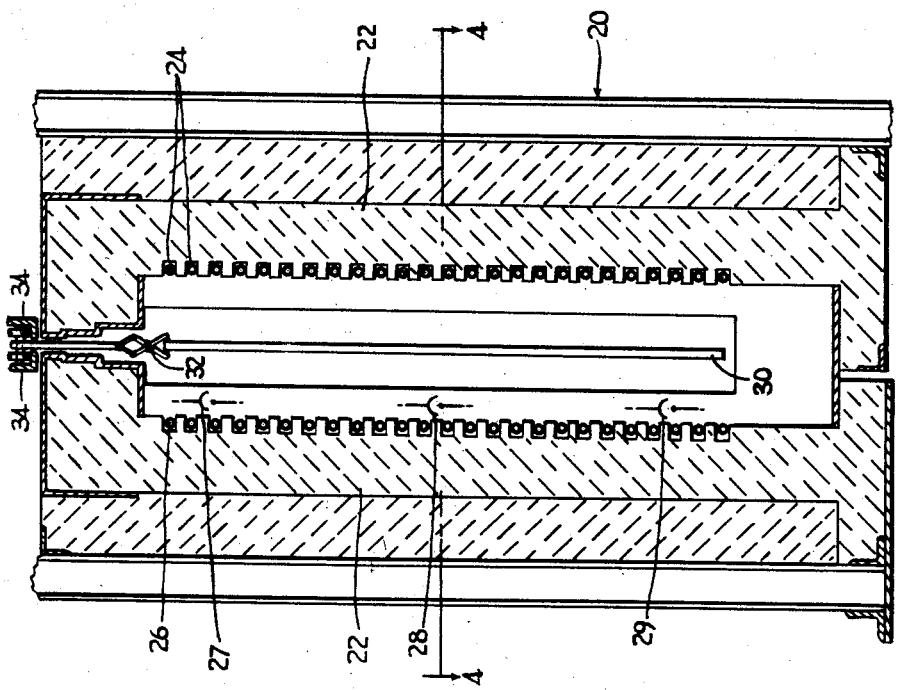
Figure 3 is a vertical cross-sectional diagram illustrating a typical embodiment of a practical device utilizing the teachings of the present invention.

Figs. 3 and 4 illustrate a typical embodiment of a practical device for the tempering of glass which utilizes the teachings of the present invention.

As seen in these drawings, a typical tempering furnace 20 is provided with walls 22 of refractory material. A plurality of laterally extending channels 24 are provided in the inner surfaces of the refractory walls. Within each of these channels are contained heating elements 26 of an electroconductive material capable of withstanding high temperatures, such as Nichrome. These electrical heating elements are coupled in three parallel banks of elements to three separate sources of electrical energy (not shown).

The current flowing through each bank of heating elements is controlled by a Rayotube type of controller 27, 28 or 29, designed by Leeds and Northrup. These Rayotubes are the thermosensitive elements which comprise a mirror, a thermopile at the focal point of the mirror, and an electric circuit actuated in response to the thermopile. Such devices are well known in the art and their structural details are not part of my invention.

Rayotube 27 is located in the upper portion of the tempering furnace, Rayotube 28 in the central portion and Rayotube 29 in the lower portion. These tubes are aimed beyond the edge of a glass sheet 30 being heated at the opposite wall of the tempering furnace and are adjustable to cause the circuits within which they are contained to pass current through the heating elements whenever the temperature of the wall at which the tube is aimed falls below a predetermined level. Thus, at a temperature about 1000° F. the temperature of the top, middle and bottom of the glass sheet being heated can be controlled to within ±4° F. The provision of three Rayotubes eliminates the natural temperature differential between the top and bottom of the tempering furnace due to convection currents within the furnace 20.

A sheet of glass 30 which is desired to be tempered is suspended from tongs 32 which are hung from overhead tracks 34. The tongs are provided with means such as rollers (not shown) at their upper ends for horizontal movement along the tracks. Thus, a glass sheet 30 to be tempered is conveyed within the furnace until it is brought into alignment with the heating elements 26. The Rayotubes are set to provide a wall temperature and hence a furnace temperature, of such a magnitude that the most efficient heating of the glass takes place. The glass is then removed from the furnace and suddenly chilled to provide the required temper, in accordance with conventional tempering procedures. However, the heating of the glass is accomplished in accordance with the teachings of the present invention and, therefore, the glass sheet is more uniformly heated throughout its entire volume rather than overheated near its surfaces. That is, the residual temperature gradient within the glass sheet from surface to center, after the heating cycle has been completed, is minimized.

Figure 5:
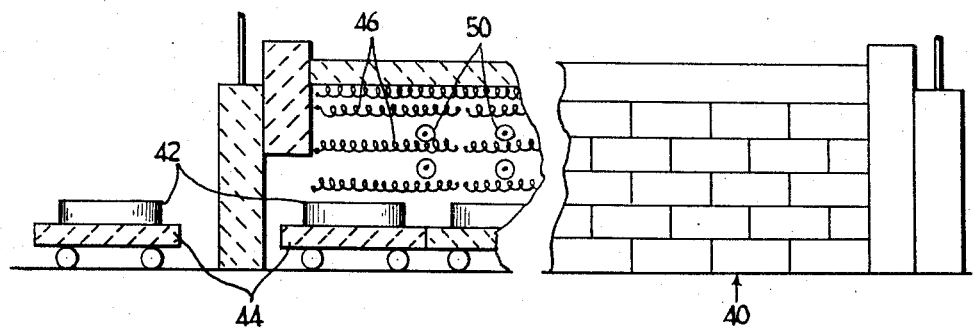
Figure 5 is a side elevation, partially in section and partially symbolic, of a horizontal glass bending lehr in which the teachings of this invention are utilized.
Figure 6:
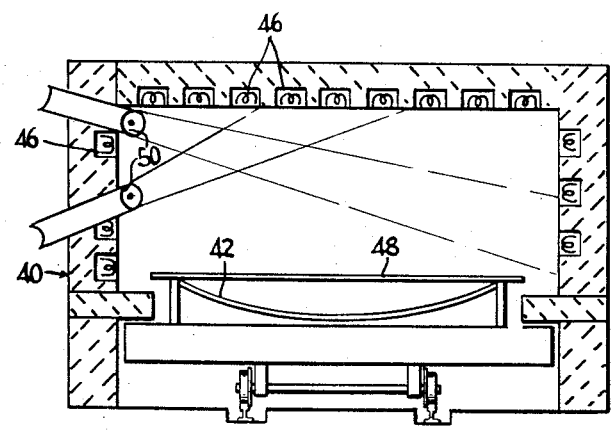
Figure 6 is a vertical sectional view of the horizontal bending lehr shown in Figure 5.

Figures 5 and 6 represent two different views of a horizontal bending lehr used for bending glass into desired shapes such as are presently required for automobile windshields. In bending glass to form the desired shapes, the present conventional practice includes preheating the glass sheet to be bent, then bending the glass sheet and finally annealing the glass. Since automobile manufacturers require windshields of irregular curvatures, it is necessary to heat the various portions of the glass to be bent in varying degrees and the amount of heat supplied to the different portions of the glass can be controlled by means of temperature control elements, such as the Rayotubes previously described for use with the vertical tempering furnaces. It is also important in annealing the glass that if the glass is preheated in order to be annealed it must be heated without providing a temperature gradient within the glass. In practice, such a gradient cannot be entirely eliminated, but if a minimum gradient is provided while the glass is being heated in the annealing portion of the bending lehr then a minimum gradient is present in the glass upon cooling and therefore the glass is more properly annealed. Another advantage of providing the minimum required heating in annealing the glass is that it also shortens the cycle of heating and cooling to provide annealed glass.

Turning now to Figures 5 and 6, reference number 40 represents a horizontal bending lehr. As is conventional in continuous bending operation, a plurality of bending molds 42 are mounted upon trucks 44 and passed through furnace 40 where flat glass sheets are bent to the desired shape. A plurality of heating coils 46 are disposed to radiate heat from above and from both sides of the glass sheet 48 to be bent. A plurality of Rayotubes 50 are provided along the side walls of the furnace 40 in order to control the current flowing through the various wires 46 and thereby control the amount of heat that is directed to the various portions of the glass plate 48 that is being bent. Each Rayotube is aimed at a different wall or ceiling area, comprising a plurality of heating circuit wires and the intermediate wall portions, and is thermally responsive to the average temperature at the surface scanned, thereby controlling the amount of current flowing in the wires heating that portion of the furnace wall and thereby controlling the amount of heat to be supplied at a predetermined area of the glass.

Since different degrees of heating are required in the pre-heat, bending and annealing portions of the lehr, different circuits are provided in the various parts of the lehr to supply the various amounts of heat required. Each of these circuits has its current controlled by an associated thermo-responsive Rayotube.

The following examples disclose what happens when non-efficient temperatures at radiant levels higher than those required are utilized in performing different glass operations.

*Example I—Bending*

In bending glass windshields at temperatures higher than the optimum temperatures, the surfaces are overheated and become fused.

*Example II—Tempering*

In the case of tempering, if the radiant level is too high, the surface is overheated and marks of the tongs used to suspend the glass in the tempering furnace are increased in depth. For the increase of power that is required to reach the higher radiant level, there is no corresponding improvement in the final temper of the product. Therefore, this additional power is completely wasted.

A system of determining the optimum temperature at which the walls of a furnace should be heated in order to effect the most efficient heating of any glass composition contained within the furnace should embody the teachings contained in the present disclosure with reference to the particular embodiments described.

First, the transmission characteristics of the glass should be determined for the radiant energy spectrum transmitted by radiators heated to the range of temperatures that glass is required to be subjected and then, the walls of the furnace should be heated to a temperature such that the maximum heating effect per unit of heat radiated to the glass surface is absorbed within the glass volume heated.

However, the temperature to which the glass surface is heated is required to be a certain irreducible minimum, namely, that sufficient to soften the glass. At this minimum temperature, the peak of radiation intensity is supplied at a longer wavelength than at higher temperatures. However, when speed of operation is a more important factor than thermal efficiency the total effective heat supplied to the glass may be increased over a range of increasing temperatures because of the additional total heat of lesser efficiency supplied at higher temperatures. However, once the temperature is raised to such a level that the peak of radiation intensity occurs at a wavelength at which the glass has excellent transmissivity, any additional increase in temperature due to an increase in heat supplied does not serve to provide additional heat that can be utilized by the glass, but instead, results in an inefficient absorption of heat by the glass to such an extent that a lesser percent of heat is absorbed by the glass at very high temperatures and more heat is wasted.

The determination of the most efficient temperature for heating each glass composition depends on the optical properties of each composition as does the determination of the temperature at which the maximum heating takes place.

This application is a continuation of my copending patent application, Serial No. 330,833, filed January 12, 1953, and entitled Electric Furnace Control Method.

I claim:

1. A method of providing a controlled pattern of heating of glass bodies in a furnace, which comprises heating the walls of a furnace by passing current through electrical heating elements mounted on portions only of areas of the walls of the furnace measuring separately each of the areas for radiant energy level, placing a glass body in the furnace, continuing the measurement of the radiant energy of said areas and separately controlling the electrical current to the heaters in said portion only of the areas to maintain the measured radiant energy levels in said areas until the glass body has been heated to the predetermined temperature pattern, and removing the glass body from the furnace.

2. A method of providing heating uniformly to areas of glass bodies in a furnace, which comprises heating the walls of a furnace by passing current through electrical heating elements mounted on portions only of areas of the walls of the furnace to provide said areas of the walls emitting radiant energy at the same predetermined level, measuring separately each of the areas of the walls for radiant energy level, placing a glass body in the furnace, continuing the measurement of the radiant energy levels of said areas and separately controlling the electrical current to the heaters in said portions only of the areas to maintain the measured radiant energy level for each area of the walls until the glass body has been heated to the desired temperature, and removing the glass body from the furnace.

References Cited in the file of this patent

UNITED STATES PATENTS

| | | |
|---|---|---|
| 1,506,443 | Otis | Aug. 26, 1924 |
| 1,670,846 | Cope | May 22, 1928 |
| 1,810,172 | Hayes | June 16, 1931 |
| 1,944,449 | Munro | Jan. 23, 1934 |
| 1,976,461 | Prince | Oct. 9, 1934 |
| 2,015,838 | Borden et al. | Oct. 1, 1935 |
| 2,127,889 | Shenk et al. | Aug. 23, 1938 |
| 2,176,999 | Miller | Oct. 24, 1939 |
| 2,177,805 | Hogg et al. | Oct. 31, 1939 |
| 2,377,946 | Leary | June 12, 1945 |
| 2,438,160 | Green | Mar. 23, 1948 |
| 2,441,672 | Roy | May 18, 1948 |
| 2,452,488 | Paddock | Oct. 26, 1948 |
| 2,646,647 | Bamford | July 28, 1953 |
| 2,671,988 | Walters | Mar. 16, 1954 |

FOREIGN PATENTS

| | | |
|---|---|---|
| 675,492 | Great Britain | July 9, 1952 |

OTHER REFERENCES

"Infrared," by L. R. Kaller in General Electric Review, March 1941, pp. 167–173.

UNITED STATES PATENT OFFICE

CERTIFICATE OF CORRECTION

Patent No. 2,924,695                                February 9, 1960

Florian V. Atkeson

It is hereby certified that error appears in the printed specification of the above numbered patent requiring correction and that the said Letters Patent should read as corrected below.

Column 2, line 10, for "soda-line-silica" read -- soda-lime-silica --; line 46, for "energizes" read -- energies --; column 6, line 1, for "portion" read -- portions --; line 35, list of references cited, under "UNITED STATES PATENTS" for "Roy" read -- Ray --.

Signed and sealed this 4th day of April 1961.

(SEAL)
Attest: ERNEST W. SWIDER

Attesting Officer                                ARTHUR W. CROCKER
                                                                      Acting Commissioner of Patents